// United States Patent [15] 3,686,543
Nyul [45] Aug. 22, 1972

[54] ANGLED ARRAY SEMICONDUCTOR LIGHT SOURCES

[72] Inventor: Paul Nyul, Flemington, N.J.

[73] Assignee: RCA Corporation, New York, N.Y.

[22] Filed: Feb. 8, 1968

[21] Appl. No.: 704,152

[52] U.S. Cl. ................317/235 N, 331/94.5, 307/312
[51] Int. Cl. ............................H01s 3/18, H01l 15/00
[58] Field of Search ..331/94.5; 307/312; 313/108 Q; 317/235 N

[56] References Cited

UNITED STATES PATENTS 3,290,539 12/1966 LaMorte................313/108 X
3,593,191 7/1971 Henker..................317/235 N

*Primary Examiner*—Benjamin A. Borchelt
*Assistant Examiner*—N. Moskowitz
*Attorney*—Glenn H. Bruestle

[57] ABSTRACT

A light emitting array consisting of a number of prismatically shaped injection type light emitting diodes arranged in angled pairs. Light emitted from a surface of one laser of each pair is reflected from an adjacent surface of the other laser of the pair in a specified direction; similarly, light emitted from the adjacent surface of the other laser of the pair is reflected from the light emitting surface of the first laser, in the same specified direction. Adjacent pairs may be optically coupled, utilizing lasers which emit two light beams in opposite directions, to lower the current threshold of the array and to increase its efficiency.

22 Claims, 5 Drawing Figures

Patented Aug. 22, 1972 3,686,543

2 Sheets-Sheet 1

INVENTOR
PAUL NYUL

BY [signature]
ATTORNEY

INVENTOR
PAUL NYUL
BY [signature]
ATTORNEY

ANGLED ARRAY SEMICONDUCTOR LIGHT SOURCES

BACKGROUND OF THE INVENTION

The invention herein described was made in the course of or under a contract or subcontract thereunder with the Department of the Army.

This invention relates to the field of light emitting semiconductor devices, and more particularly to arrays of light emitting devices of the P-N junction type.

The injection laser and injection electroluminescent diode are devices presently well known in the art, each emitting electromagnetic radiation when minority carriers injected across a P-N junction recombine, with a consequent emission of photons having a wavelength related to the energy gap of the semiconductor material.

In order to obtain high quality light emitting devices of good spectral purity and reasonable efficiency, it has been necessary to limit the dimensions of individual devices to extremely small values, on the order of a few thousandths of an inch. Consequently, much effort has been devoted toward development of arrangements of light emitting semiconductor devices in closely packed arrays, in order to realize a high intensity electrically controlled light source. One array of this type is described in U. S. Pat. application Ser. No. 677,571, filed Oct. 24, 1967, and assigned to the assignee of the instant application.

However, this array (as well as the other arrays heretofore known) suffers from the disadvantage that all of the individual light sources do not lie in a common plane. Consequently, reasonably simple optical systems can provide only a limited collimation of the light beam radiated from the array.

In addition, most of the arrays heretofore known do not provide intercoupling of the individual devices in such a manner as to achieve good optical power efficiency.

An object of the present invention is to provide an improved array of light emitting injection type semiconductor devices.

Another object is to provide such an array, wherein all of the individual light sources appear to lie in a common plane.

Another object of the invention is to provide such an array having improved optical power efficiency.

SUMMARY

The invention provides a plurality of semiconductor devices arranged in one or more angled pairs on a substrate surface. Each device is capable of emitting light. The devices of each pair are arranged relative to each other so that light emitted from one end of one device is reflected from the adjacent end of the other device of the pair in a specified direction, and light emitted from one end of the other device is reflected from the adjacent end of the first device in a given direction, which may be parallel to the specified direction.

Each device is disposed on the substrate. According to the preferred embodiment of my invention, the substrate is provided with a conductive layer which serves to apply a potential to an electrode of the device.

IN THE DRAWING

DETAILED DESCRIPTION

Figure 1:
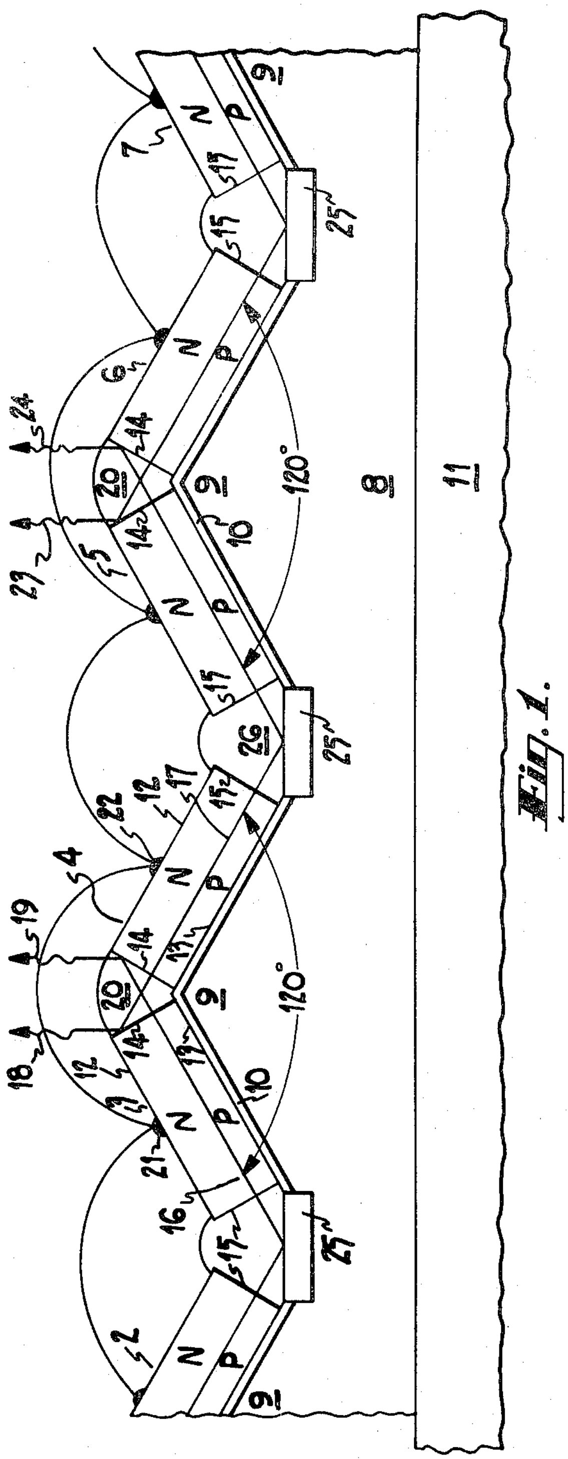
FIG. 1 shows a light emitting array according to a preferred embodiment of the invention.

The array 1 shown in FIG. 1 consists of a plurality of inclined pairs of light emitting diodes 2 to 7. Diodes 3 and 4 as well as diodes 5 and 6, are each arranged as an angled pair. Each of the diodes 2 to 7 is mounted on an insulating substrate 8, which may comprise a material of relatively good thermal conductivity such as beryllium oxide.

The principal surface of the beryllium oxide substrate 8 is in the form of a number of raised portions 9, each in the shape of an inverted "V". Each of the raised portions 9 is metallized with a thin layer 10 consisting of a molybdenum-manganese alloy base layer covered with an overlying layer of nickel and a layer of gold on the nickel layer. The electrically conductive metallic layer 10 serves as one terminal of the array 1. Each of the diodes 2 to 7 has a metallic electrode layer on its lower surface which is directly bonded to the conductive layer 10.

The beryllium oxide substrate 8 may be mounted to a relatively massive heat sink 11 which serves to remove heat generated by the individual diodes of the array.

Each individual diode of the array includes a P type region and an adjacent N type region with a substantially planar P-N junction therebetween. Each diode is shaped in the form of a rectangular prism, so that the P-N junction is parallel to upper and lower surfaces 12 and 13 and normal to end surfaces 14 and 15 of the prism. The adjacent diodes 3 and 4, e.g., are inclined on the raised portions 9 of the substrate 8 so that P-N junctions 16 and 17 are inclined at a relative angle of 120°; the adjacent end surfaces of diodes 3 and 4 are disposed at an angle of 60° with respect to each other.

With this geometric arrangement, and with the individual diodes designed so that their end surfaces 14 and 15 provide good reflectivity, application of a sufficient potential difference to produce current flow across the P-N junctions 16 and 17 causes emission of light from the end surfaces 14 and 15. The light emitted from the end surface 14 of the device 4 is reflected from the adjacent end surface 14 of the device 3 to emerge as radiation in a direction indicated by the line 18. With the above-described geometry, the N type region of each diode should have a thickness greater than that of the adjacent P type region. In any event, the uppermost active region of each diode should have a greater thickness than the underlying opposite conductivity type region. This insures that light emitted from the end surface 14 of the device 3 will strike (and be reflected from) the adjacent end surface 14 of the device 4.

Similarly, light emitted from the end surface 14 of the device 3 is reflected from the adjacent end surface 14 of the device 4 to emerge in the direction indicated by the line 19, which is parallel to the direction indicated by the line 18.

A lens 20 comprising a transparent epoxy material having an index of refraction between (i) that of the semiconductor material comprising the devices 3 and 4 and (ii) air is disposed between the adjacent end surfaces 14 of the devices 3 and 4 to provide improved coupling of the emitted light to the surrounding atmosphere.

Each of the devices 3 and 4 has a metallic layer contiguous with the upper and lower major surfaces 12 and 13 thereof to serve as the device electrodes. As previously stated, the lower electrode layer is directly electrically bonded to the metallized layer 10 on the raised portion 9 of the substrate 8. Individual terminal leads 21 and 22 are soldered or otherwise bonded to the electrode layers disposed on the upper surface 12 of each of the diodes 3 and 4, respectively.

The angled pair consisting of adjacent diodes 3 and 4 may be electrically activated by interconnecting the terminal leads 21 and 22 by applying a potential difference between these interconnected leads and the conductive layer 10, the potential difference being unidirectional and in such a direction as to forward bias each of the P-N junctions 16 and 17 to produce current flow across each junction sufficient to cause light emission therefrom.

Each of the devices 3 and 4 may be operated, as mentioned above, so as to exhibit noncoherent injection electroluminescence. Alternatively, the current flow across each of the P-N junctions 16 and 17 may be made sufficient to exceed the threshold value required for lasing to occur, so that each device functions as an individual semiconductor injection laser.

The adjacent diodes 5 and 6 form an angled pair which functions in a manner similar to that described above for diodes 3 and 4, the resultant light being emitted in the directions indicated by the lines 23 and 24, parallel to direction lines 18 and 19.

The term "light" as used in this description is intended to include infrared and ultraviolet as well as visible electromagnetic radiation.

In similar fashion, any desired number of angled pairs of diodes may be arranged on the raised portions 9 of the substrate 8. The light emitted from each of these angled pairs appears to originate in a single plane, since each of the end surfaces 14 lies in substantially the same plane.

Improved optical power efficiency is achieved by coupling light emitted from (i) the other end 15 of each of the devices 2 to 7 to (ii) the corresponding end of an adjacent device. This coupling is achieved by means of reflective surfaces 25 embedded in the substrate 8. The reflective surfaces 25 may comprise, e.g., a micro-mirror of silvered glass or highly polished layer of gold or silver. In this fashion light emitted from the end surface 15 of the device 4 is coupled to the adjacent end surface 15 of the device 5 by reflection from the layer 25.

To improve the optical coupling, a transparent plastic material, such as the epoxy known as Stycast 1264 and manufactured by Emerson and Cuming, Inc., Canton, Mass., may be disposed to provide a mass 26 between the adjacent end surfaces 15 of the devices 4 and 5. The transparent mass 26 has an index of refraction greater than that of air and less than that of the semiconductor material which comprises the devices 4 and 5, so that the efficiency of optical coupling between the adjacent surfaces 15 of these devices is improved.

This optical coupling between adjacent devices serves to lower the threshold current required to produce lasing action in the individual devices, and to increase the optical power efficiency of the array.

While a variety of semiconductor materials is available for manufacturing the individual light emitting devices 2 to 7, I prefer to employ gallium arsenide for the semiconductor material when an infrared light emitting array is desired, and gallium arsenide-phosphide for the semiconductor material where the emission of visible light is desired.

Since all the emitted light, as indicated by the direction lines 18, 19, 23 and 24, appears to originate in a common plane, the light may be highly collimated by means of a relatively simple lens or reflector to provide a highly directional beam of extremely small fan-out angle.

Rather than operating all of the individual devices of the array 1 in electrically parallel connection, the conductive layer 10 may be formed into individual strips interconnected to the terminal leads on the upper surface of the individual devices, so as to provide series or series-parallel interconnection wiring arrangements.

Another manner in which the array can be fabricated is one in which the active regions of the adjacent devices of each angled pair are mutually inverted. The array shown in FIG. 2 is of this type, and represents an alternative embodiment of the invention which is intended to operate with a bidirectional or alternating polarity applied voltage, so that half of the devices are operated at any one time.

Figure 2:
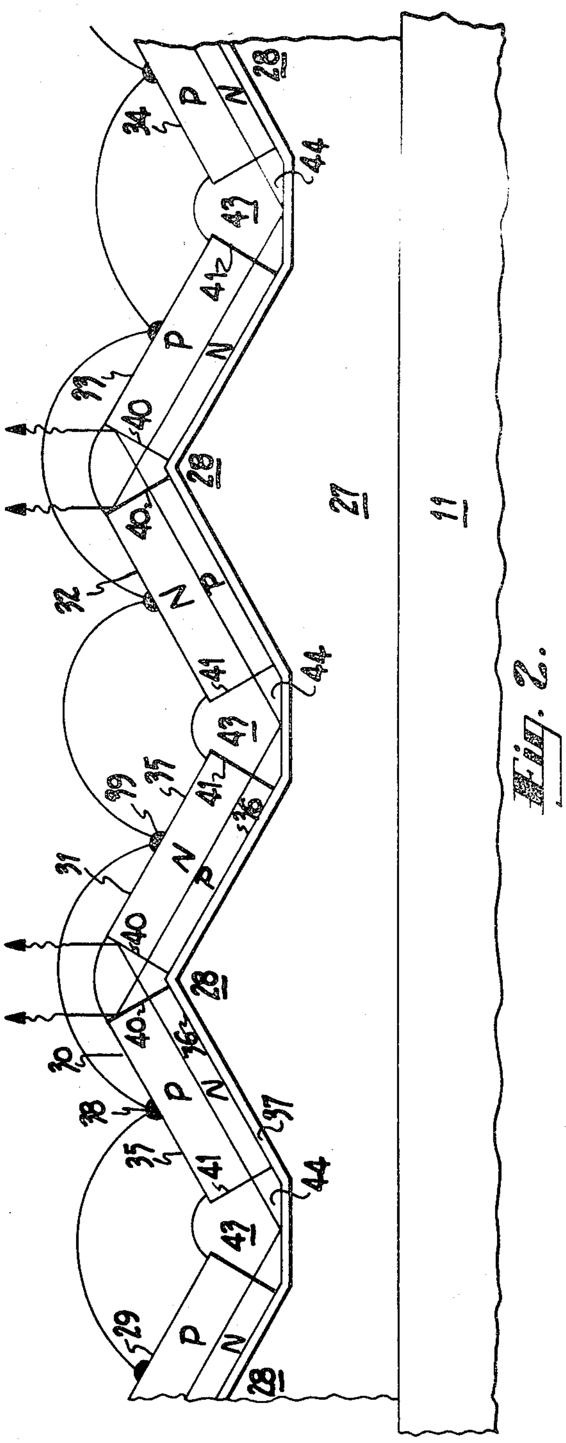
FIG. 2 shows a light emitting array according to an alternative embodiment of the invention.

The array of FIG. 2 consists of a substrate 27 of a heat conductive material (such as beryllium oxide) having raised portions 28. It is not necessary that an insulating substrate be used. The substrate 27 (as well as the substrate 8 of FIG. 1) may comprise any suitable metal (such as molybdenum) having thermal expansion characteristics relatively close to those of the semiconductor material of which the individual devices 29 to 34 are composed. As before, the substrate 27 may be mounted on a relatively massive heat sink 11.

Referring, e.g., to the P pair consisting of adjacent devices 30 and 31, the p type region of the device 30 is adjacent the upper major surface 35 thereof. The upper major surface 35 of the device 31 is adjacent the N type region thereof. A metallic electrode layer is contiguous with the lower major surface 36 of each of the devices 30 and 31, these lower electrode layers being directly electrically bonded to the metallic layer 37 which is disposed on the principal surface of the substrate 27.

Terminal leads 38 and 39 are bonded to electrode layers disposed on the upper surfaces of the devices 30 and 31, respectively. All the terminal leads on the upper surface of the devices of the array are interconnected to form one electrical terminal of the array. The electrically conductive layer 37 forms the other terminal of the array. When an alternating voltage is applied across the array terminals, half the devices will be electrically forward biased and therefore operating when the alternating voltage is of a given polarity and the other half of the devices will operate when the alternating voltage is of opposite polarity.

When the alternating voltage is polarized such that the terminal leads connected to the upper device surfaces are relatively positive, the devices 29, 30, 33 and 34 will be operated. Light emitted from the end surface 40 of each of these devices is reflected from the adjacent end surface 40 of the other (not operating) device of the corresponding pair to emerge in the direction indicated by the corresponding arrow.

Similarly, when the alternating voltage is polarized so that the terminal leads on the upper device surfaces are relatively negative, the devices 31 and 32 are operated, light being reflected from the adjacent end surface of the (not operating) device of the corresponding pair in similar fashion to that previously discussed.

Optical coupling between adjacent end surfaces is provided in similar fashion to that discussed in connection with the array 1 shown in FIG. 1.

In the event it is not necessary to lower the device threshold by optical coupling between adjacent devices of different pairs, the end surfaces 15 shown in FIG. 1 and the end surfaces 41 shown in FIG. 2 may be provided with a totally reflective layer (not shown), so that light is emitted from only the end surface 14 (FIG. 1) or 40 (FIG. 2) of each device.

In the array of FIG. 2, light coupling between adjacent devices of different pairs is provided by means of transparent plastic masses 43 having indices of refraction between that of air and that of the semiconductor material, and by portions 44 of the conductive layer 37 disposed on the substrate 27. The portions 44 are highly polished to provide good light reflectivity.

Another advantage of this array is that when one diode of each pair is forward biased, the other (not operating) diode of the pair acts to protect the operating diode from inverse polarity pulses which may be present in the external circuitry. Such inverse polarity pulses have been a common cause of device failure in arrays heretofore known.

Figures 3, 4:
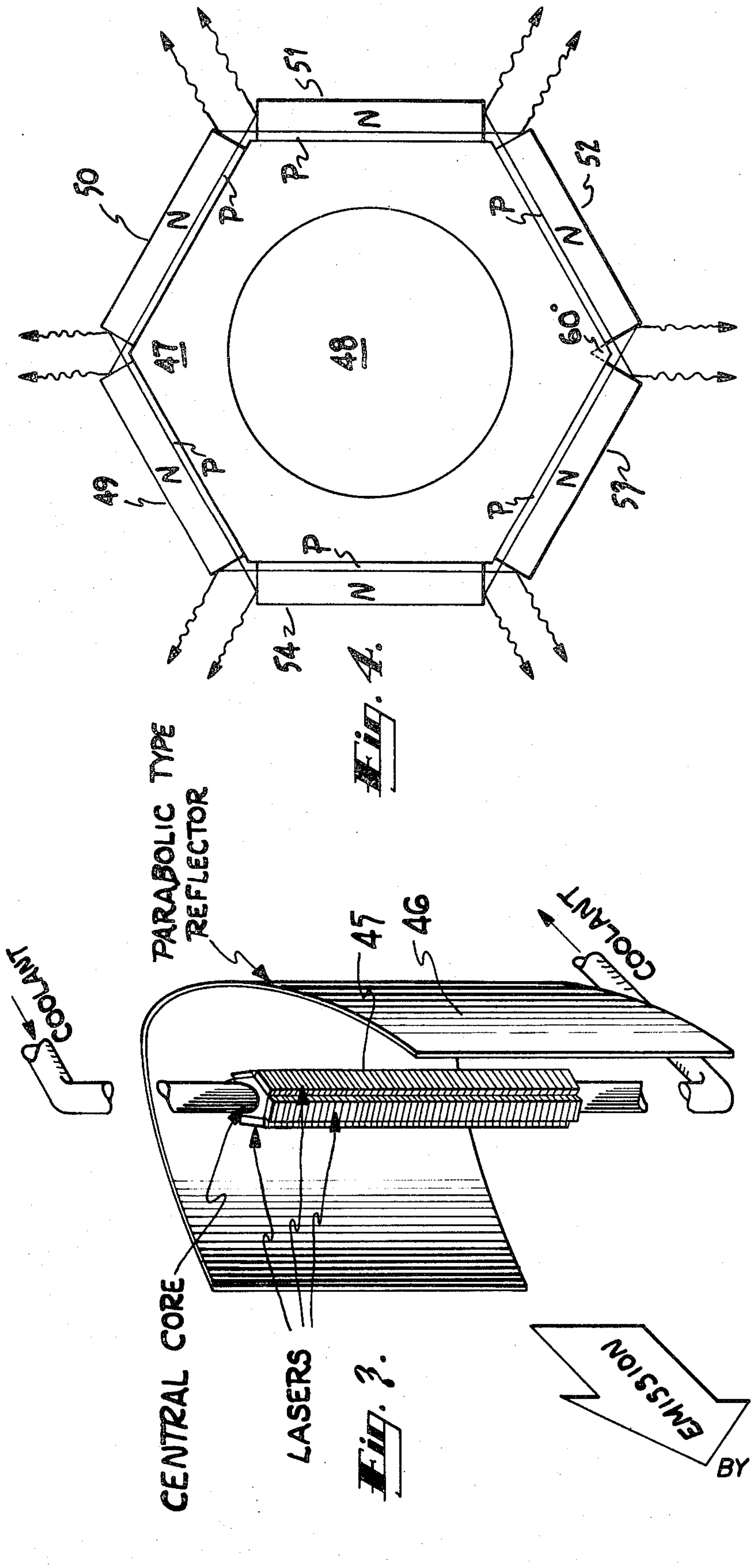
FIG. 3 shows a light emitting array according to still another embodiment of the invention.
FIG. 4 shows a plan view of the active portion of the array of FIG. 3.

Another embodiment of the invention, in which a large number of individual light emitting semiconductor devices are arranged in angled array fashion to provide a filament 45, is shown in FIG. 3. The filament 45 is aligned with the focal axis of a parabolic cylindrical light reflecting element 46 to provide a highly collimated intense beam of emitted light. The filament 45 may be provided with a hollow central core through which a suitable cooling fluid is passed to permit array operation at relatively high power levels without undue temperature rise.

The filament 45 consists of a thermally conductive regular hexagonal prism 47 having a longitudinal hole 48 therein, as seen in FIG. 4. Disposed on each external face of the prism 47 is a generally prismatic light emitting semiconductor device. Each of the six semiconductor devices 49 to 54 is arranged so that light is emitted from both opposed end surfaces thereof and reflected from the end surface of each adjacent device in a specified direction as indicated by the arrows shown in FIG. 4.

Since the various faces of the prism 47 are inclined at relative angles of 120°, and since the P-N junction of each of the devices 49 to 54 is parallel to the major surfaces thereof, and parallel to the corresponding face of the prism 47, it follows that the light reflected from the end surfaces of the adjacent devices will emerge in a direction radial to the hexagonal cross-section of the prism 47, i.e., normal to the axis of symmetry of the prism 47. The longitudinal hole 48, as previously mentioned, is employed for passage of a coolant fluid to permit high power operation of the array.

While the structure shown in FIGS. 3 and 4 provides a filament which emits light radially utilizing the principle of reflection from the end surface of an adjacent device, optical coupling between the P-N junctions of adjacent devices is not employed, as it was in the embodiments shown in FIGS. 1 and 2. Therefore, when the individual devices 49 to 54 are operated as lasers, the structure shown in FIGS. 3 and 4 may (under similar operating conditions) exhibit a somewhat higher threshold current than that of the arrays shown in FIGS. 1 and 2.

Figure 5:
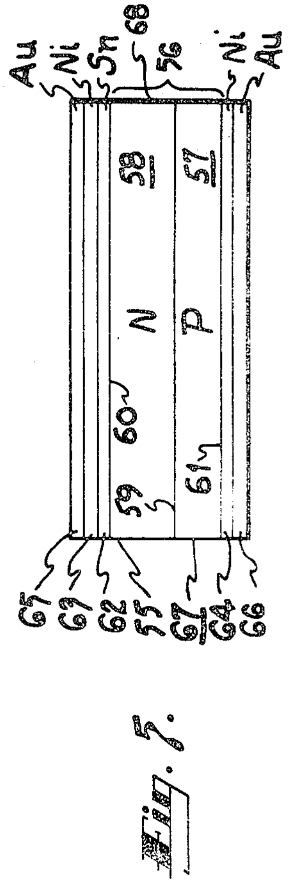
FIG. 5 shows a side view of a light emitting diode which may be employed in the embodiments shown in FIGS. 1 to 4.

While many structures may be employed for the individual light emitting devices of the array of the invention, I prefer to employ that shown in FIG. 5. The individual device 55 is of generally prismatic shape, comprising a body of gallium arsenide or gallium arsenide-phosphide semiconductor material 56 having a P type region 57 and an adjacent N type region 58 with a P-N junction 59 therebetween. The P-N junction 59 is substantially planar and lies in a plane parallel to both the upper and lower major surfaces 60 and 61 of the semiconductor body 56.

Disposed on the upper surface 60 is an evaporated layer 62 of tin, which makes good ohmic contact to the N type region 58. Disposed on the layer 62 and on the lower surface 61 of the semiconductor body 56 are evaporated layers of nickel 63 and 64, respectively. Disposed on these nickel layers are electrolessly plated gold layers 65 and 66, respectively.

The end surfaces 67 and 68 of the semiconductor body 56 are optically flat, optical flatness being obtained by cleaving the semiconductor body (which is monocrystalline) parallel to a selected crystallographic plane.

The other side surfaces of the semiconductor body 56 are rough sawed or otherwise treated to render them relatively nonreflective.

The individual devices may be secured to a metallic layer disposed on the array substrate to which they are to be bonded, by (i) interposing a lead preform between the device and the substrate layer, and (ii) heating the device to melt the preform and provide a solder joint of good electrical conductivity and mechanical strength.

I claim:

1. A light emitter, comprising:

A. a substrate having a principal surface;

B. a plurality of generally prismatic semiconductor devices arranged in angled pairs on said principal surface, each device comprising:

a. a body of semiconductor material having upper and lower opposed major surfaces, b. first and second adjacent regions of mutually different conductivity types in said body contiguous with said upper and lower surfaces, respectively, c. the interface between said regions forming a substantially planar P-N junction, d. said body having first and second opposed end surfaces, a given one of said end surfaces being optically flat, and e. first and second electrodes contiguous with said upper and lower major surfaces for electrically contacting said first and second regions, respectively, f. such that when a given potential difference is applied to said electrodes to cause current to flow across said P-N junction, light is emitted from said given end surface substantially in the plane of the junction;

C. the devices of each pair being inclined relative to each other so that the given end surfaces of said devices are adjacent, and light emitted from the given end surface of one device of the pair is reflected from the adjacent end surface of the device of the pair in a specified direction, light emitted from the given end surface of the other device of the pair being reflected from the adjacent end surface of said one device also in said specified direction;

D. an electrically conductive layer on said principal surface;

E. each said device being bonded directly to said substrate so that the second electrode of each device is electrically connected to said conductive layer; and F. means including said conductive layer for applying said potential difference to the electrodes of each device.

2. A light emitter according to claim 1, wherein the opposed end surfaces of each device form an optical cavity, said end surface being sufficiently reflective so that each device functions as an injection laser when said current flow exceeds a predetermined threshold value.

3. A light emitter according to claim 2, wherein the P-N junction plane of each device is substantially parallel to both major surfaces of the device and normal to the end surfaces thereof, the junction planes of the adjacent devices of each pair being oriented at an angle of 120° with respect to each other.

4. A light emitter according to claim 1, wherein light is emitted from both end surfaces of each device, said device pairs being situated in a row, further comprising means for coupling light emitted from an end surface, other than said given end surface, of a selected device of a particular pair to an adjacent end surface, other than said given end surface, of an adjacent selected device of another pair, thereby to reduce said predetermined threshold value for said selected devices.

5. A light emitter according to claim 4, wherein said coupling means includes a light reflective substance on said substrate surface.

6. A light emitter according to claim 5, wherein said coupling means includes a transparent medium disposed between said coupled end surfaces and having an index of refraction between that of air and that of said semiconductor material.

7. A light emitter according to claim 1, further comprising a lens, having an index of refraction between that of air and that of said semiconductor material, disposed between said adjacent end surfaces for collimating any light radiated therefrom.

8. A light emitter according to claim 1, wherein said angled pairs are arranged in a row so that the light emitted from said devices and reflected from said adjacent end surfaces appears to originate substantially in a single plane.

9. A light emitter according to claim 1, wherein the first regions of the devices of each pair are of the same conductivity type.

10. A light emitter according to claim 4, wherein the first regions of the devices of each pair are of mutually different conductivity types, the first electrodes of the devices of each pair are electrically interconnected, the second electrodes of the devices of each pair are also electrically interconnected, and said potential difference is bidirectional.

11. A light emitter according to claim 10, wherein the first regions of said adjacent selected devices are of the same conductivity type.

12. A light emitter according to claim 1, wherein said substrate is in the shape of a regular hexagonal prism, each of said devices being situated so that said specified direction is normal to the axis of symmetry of the substrate.

13. A light emitter according to claim 12, wherein said substrate has a longitudinal hole therethrough, further comprising means for cooling the light emitter including means disposing a coolant fluid within said hole.

14. A light emitter according to claim 12, further comprising a parabolic cylindrical light reflector having a focal axis coincident with the axis of symmetry of said substrate.

15. A light emitter, comprising:

a number of semiconductor devices arranged in angled pairs, each device having two electrodes and a reflective end surface capable of emitting light when a predetermined potential difference is applied between the device electrodes;

a substrate;

each pair being arranged on the substrate with the light emitting end surfaces of the devices of the pair adjacent and relatively inclined so that light emitted from the end surface of one device of the pair is reflected from the adjacent end surface of the other device of the pair in a specified direction, and light emitted from the end surface of said other device is reflected from the end surface of said one device in said specified direction.

16. A light emitter according to claim 1, wherein each of said end surfaces is optically flat and each device emits coherent light when the current flowing between the device electrodes exceeds a given threshold value, further comprising means for optically coupling the light emitted from at least one device of a pair to an adjacent device of a different pair.

17. A light emitter according to claim 15, wherein said end surfaces lie in a substantially common plane.

18. A light emitter, comprising:

first and second semiconductor devices, each device having two electrodes and two opposed end surfaces, each device being capable of emitting light from at least one end surface thereof when a predetermined potential difference is applied between the device electrodes;

a substrate;

said devices being disposed on the substrate with one end surface of said first device adjacent one end surface of said second device, so that light emitted from the one end surface of the first device is reflected from the one end surface of the second device in a first direction, and light emitted from the one end surface of the second device is reflected from the one end surface of the first device in a second direction.

19. A light emitter according to claim 18, wherein said first and second directions wre mutually parallel.

20. Semiconductor light emitting apparatus, comprising a pair of prismatic semiconductor bodies, each body having a planar P-N junction and mutually parallel end surfaces which are perpendicular to said junction, said bodies being disposed generally end-to-end with their adjacent end surfaces at an angle of 60° with each other, so that light emitted from the adjacent end surface of each of said bodies is reflected 90 from the adjacent end surface of the other of said bodies and long a path parallel to the plane bisecting said angle.

21. Apparatus according to claim 20, further comprising a plurality of said pairs of bodies disposed in a generally linear zigzag arrangement with a remote end surface of one body of one pair being adjacent to and optically coupled to a remote end surface of one body of another pair.

22. Apparatus according to claim 20, further comprising a plurality of said pairs of bodies disposed in a hexagonal closed loop arrangement with a remote end surface of one body of one pair being disposed adjacent to and at an angle of 60° with a remote end surface of one body of another pair.

* * * * *